(12) United States Patent
Lin et al.

(10) Patent No.: US 9,948,868 B2
(45) Date of Patent: Apr. 17, 2018

(54) MULTI-POINT SPECTRAL SYSTEM AND MULTI-POINT SPECTRAL MODULE TO BE MOUNTED ON, CLIPPED ON OR CONNECTED TO AN IMAGE CAPTURING MODULE OF AN ELECTRONIC DEVICE EASILY

(71) Applicant: INDUSTRIAL TECHNOLOGY RESEARCH INSTITUTE, Hsinchu Hsien (TW)

(72) Inventors: Yan-Rung Lin, Hsinchu (TW); Hsin-Yi Chen, Hsinchu (TW); Chia-Liang Yeh, Hsinchu (TW); Yi-Chen Hsieh, Hsinchu (TW)

(73) Assignee: INDUSTRIAL TECHNOLOGY RESEARCH INSTITUTE, Hsinchu Hsien (TW)

( * ) Notice: Subject to any disclaimer, the term of this patent is extended or adjusted under 35 U.S.C. 154(b) by 211 days.

(21) Appl. No.: 14/980,532

(22) Filed: Dec. 28, 2015

(65) Prior Publication Data

US 2017/0163901 A1 Jun. 8, 2017

(30) Foreign Application Priority Data

Dec. 2, 2015 (TW) .............................. 104140286 A

(51) Int. Cl.
*H04N 3/14* (2006.01)
*H04N 5/265* (2006.01)
(Continued)

(52) U.S. Cl.
CPC ............ *H04N 5/265* (2013.01); *G02B 3/0006* (2013.01); *G02B 5/201* (2013.01); *G02B 7/14* (2013.01);
(Continued)

(58) Field of Classification Search
CPC .......... H04N 5/265; H04N 9/04; G01J 3/2823; G01J 2003/2826
See application file for complete search history.

(56) References Cited

U.S. PATENT DOCUMENTS

| 4,957,371 A | 9/1990 | Pellicori et al. |
| 7,385,704 B2 | 6/2008 | Mestha et al. |

(Continued)

FOREIGN PATENT DOCUMENTS

| CN | 101320138 | 12/2008 |
| CN | 101889346 | 6/2012 |

(Continued)

OTHER PUBLICATIONS

Taiwanese Office Action for Taiwanese Patent Application No. 104140286 dated Aug. 22, 2016.

(Continued)

*Primary Examiner* — Sinh Tran
*Assistant Examiner* — Selam Gebriel
(74) *Attorney, Agent, or Firm* — Amin, Turocy & Watson LLP

(57) ABSTRACT

A multi-point spectral system includes an imaging lens, an image capturing module and a multiwavelength filter (MWF) disposed between the imaging lens and the image capturing module. The MWF has a plurality of narrow-bandpass filter (NBPF) units arranged in an array, and each of the plurality of NBPF units has a respective predetermined central transmitted wavelength. The multi-point spectral system is provided to capture plural spectral images of a scene, which contain spectral or color information of the scene. The multi-point spectral system may utilize the information of the plural spectral images to recognize features revealed at the scene.

16 Claims, 14 Drawing Sheets

(51) Int. Cl.

| | | |
|---|---|---|
| *G02B 3/00* | (2006.01) | |
| *G02B 5/20* | (2006.01) | |
| *G02B 7/14* | (2006.01) | |
| *G06K 9/46* | (2006.01) | |
| *G06K 9/62* | (2006.01) | |
| *H04N 5/225* | (2006.01) | |
| *H04N 9/04* | (2006.01) | |
| *G06K 9/00* | (2006.01) | |
| *G06K 9/20* | (2006.01) | |
| *G02B 5/28* | (2006.01) | |

(52) U.S. Cl.
CPC ..... *G06K 9/00536* (2013.01); *G06K 9/00664* (2013.01); *G06K 9/2018* (2013.01); *G06K 9/46* (2013.01); *G06K 9/4652* (2013.01); *G06K 9/6215* (2013.01); *G06K 9/6267* (2013.01); *H04N 5/2253* (2013.01); *H04N 5/2254* (2013.01); *H04N 5/2258* (2013.01); *H04N 9/04* (2013.01); *G02B 5/288* (2013.01); *G06K 2009/4666* (2013.01); *G06K 2209/17* (2013.01)

(56) References Cited

U.S. PATENT DOCUMENTS

| | | | |
|---|---|---|---|
| 7,554,586 B1 | 6/2009 | Imai et al. | |
| 7,855,786 B2 | 12/2010 | Sparks et al. | |
| 8,300,108 B2 | 10/2012 | Van Hoorebeke et al. | |
| 8,600,277 B2 | 12/2013 | Yoshikawa et al. | |
| 9,019,358 B2 | 4/2015 | Mestha et al. | |
| 2005/0030545 A1 | 2/2005 | Tuschel et al. | |
| 2005/0243312 A1 | 11/2005 | Geshwind et al. | |
| 2009/0009654 A1* | 1/2009 | Imai | H04N 5/332 348/360 |
| 2013/0076913 A1 | 3/2013 | Xu et al. | |
| 2013/0331669 A1* | 12/2013 | Berte | G06T 7/0016 600/324 |
| 2014/0098212 A1* | 4/2014 | Yamanaka | H04N 5/2254 348/79 |
| 2015/0044098 A1* | 2/2015 | Smart | A61B 5/0013 422/82.05 |
| 2015/0288894 A1* | 10/2015 | Geelen | G01J 3/0256 348/342 |

FOREIGN PATENT DOCUMENTS

| | | |
|---|---|---|
| CN | 202614972 | 12/2012 |
| EP | 0693786 | 6/1999 |
| TW | 200521478 | 7/2005 |
| TW | 201332352 | 8/2013 |
| TW | I472724 | 2/2015 |

OTHER PUBLICATIONS

Arvin Emadi, et al. "Design and implementation of a sub-nm resolution microspectrometer based on a Linear-Variable Optical Filter", Optics Express, vol. 20, Issue 1, pp. 489-507, 2012.

Nicolaas Tack, et al. "A Compact, High-speed and Low-cost Hyperspectral Imager" Silicon Photonics VII, Proceedings of SPIE 2012, vol. 8266, 13 pages.

* cited by examiner

MULTI-POINT SPECTRAL SYSTEM AND MULTI-POINT SPECTRAL MODULE TO BE MOUNTED ON, CLIPPED ON OR CONNECTED TO AN IMAGE CAPTURING MODULE OF AN ELECTRONIC DEVICE EASILY

CROSS-REFERENCE TO RELATED APPLICATION

This application claims the benefit of Taiwan application Serial No. 104140286, filed on Dec. 2, 2015. The entirety of the above-mentioned patent application is hereby incorporated by reference herein and made a part of this specification.

TECHNICAL FIELD

The technical field relates to a multi-point spectral system, and a multi-point spectral module being mounted on, clipped on or connected to an image capturing module of an electronic device with ease.

BACKGROUND

When electromagnetic wave projects to an object/material, the electromagnetic way may interact with the object/material through absorption, reflection, refraction, interference, or scattering and then the interacted electromagnetic wave may carry information of the object. In addition, the electromagnetic wave may stimulate the objects or the materials to radiate electromagnetic wave. Owing to that, the physical or chemical information such as compositions, moisture content, color, size, or surface structure of the objects or the materials may be extracted out by analyzing the spectrum of the scattering or reflective electromagnetic wave from the objects or the materials.

SUMMARY

An embodiment of the disclosure relates to a multi-point spectral system. The multi-point spectral system comprises an imaging lens, a color-image capturing module and a multiwavelength filter (MWF). The MWF includes a plurality of narrow-bandpass filter (NBPF) units arranged in an array, and each of the plurality of NBPF units has a respective predetermined central transmitted wavelength. The imaging lens is provided to form a plurality of duplicate images of a scene onto the plurality of NBPF units, respectively. The image capturing module includes an image-sensing region configured to be divided into a plurality of image-sensing areas corresponding to the plurality of NBPF units, respectively. Each of the plurality of image-sensing areas includes plural color micro-units arranged in an array. The MWF is located between the imaging lens and the image capturing module. The image capturing module is configured to capture the plurality of duplicate images of the scene.

Another embodiment of the disclosure relating to a multi-point spectral module according to an exemplary embodiment is provided. The multi-point spectral module is mounted on, clipped on or connected to an image capturing module of an electronic device with ease, and comprises a multiwavelength filter (MWF) and an imaging lens. The MWF includes a plurality of narrow-bandpass filter (NBPF) units arranged in an array, and each of the plurality of NBPF units has a respective predetermined central transmitted wavelength. The imaging lens is provided to form a plurality of duplicate images of a scene onto the plurality of NBPF units, respectively, and each of the plurality of duplicated images of the scene is configured to be imaged onto the image capturing module.

The foregoing will become better understood from a careful reading of a detailed description provided herein below with appropriate reference to the accompanying drawings.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
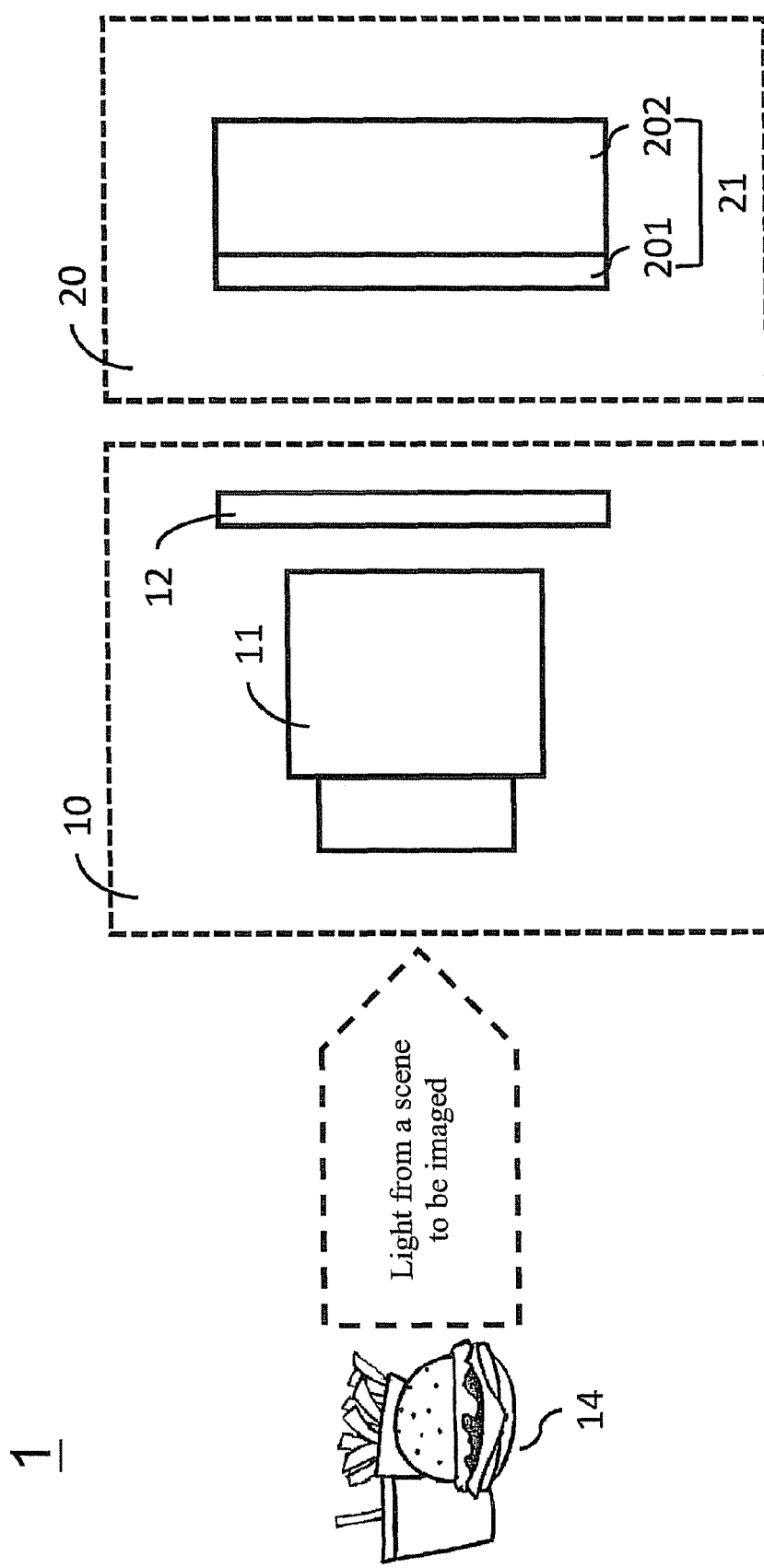
FIG. 1A illustrates a schematic view of a multi-point spectral system according to an exemplary embodiment of the disclosure.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1A illustrates a schematic view of a multi-point spectral system 1 according to an exemplary embodiment of the disclosure. The multi-point spectral system 1 comprises a multi-point spectral module 10 and an image capturing module 20. The multi-point spectral module 10 includes an imaging lens 11 and a multiwavelength filter (MWF) 12. In other words, the imaging lens 11 and the MWF 12 may be assembled together in the multi-point module 10. The multi-point spectral system 1 is to target a scene 14 and receives optical (or electromagnetic) radiation from the scene 14, and the optical radiation of the scene 14 passes through the imaging lens 11, the MWF 12 and onto the image capturing module 20. In one embodiment, the imaging lens 11 may include lens and a micro-lens array, but the scope of the present disclosure is not limited thereto.

Figure 1B:
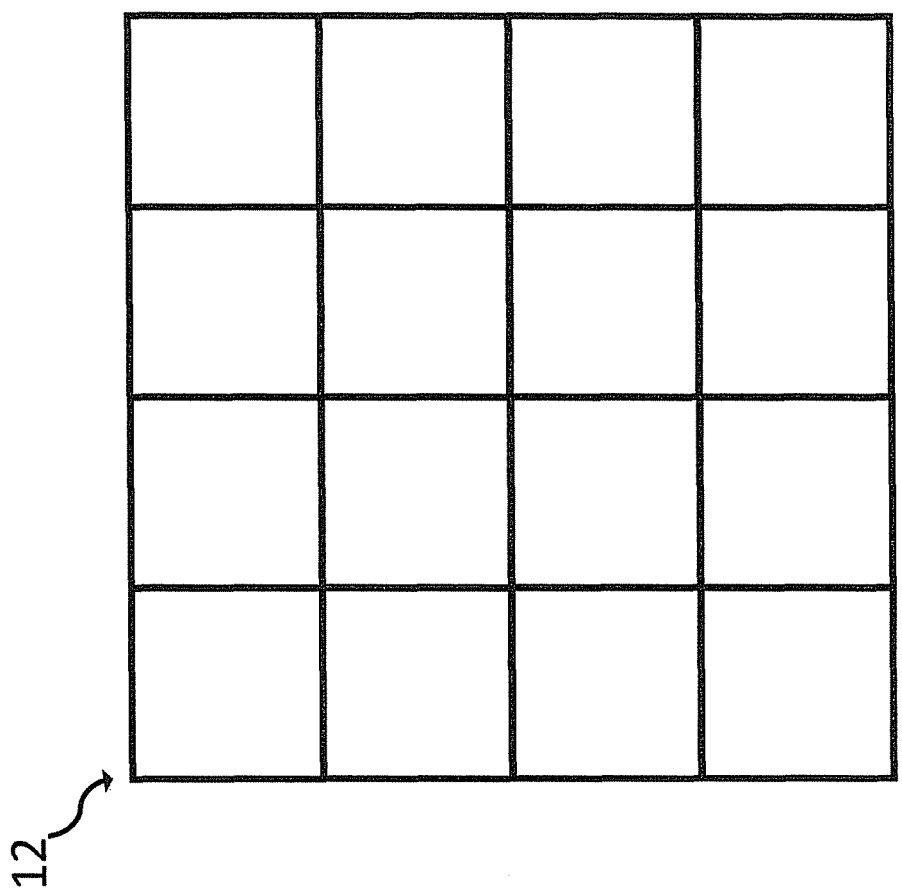
FIG. 1B illustrates a front view of the multi-wavelength filter (MWF) shown in FIG. 1A according to an exemplary embodiment of the disclosure.
Figure 1C:
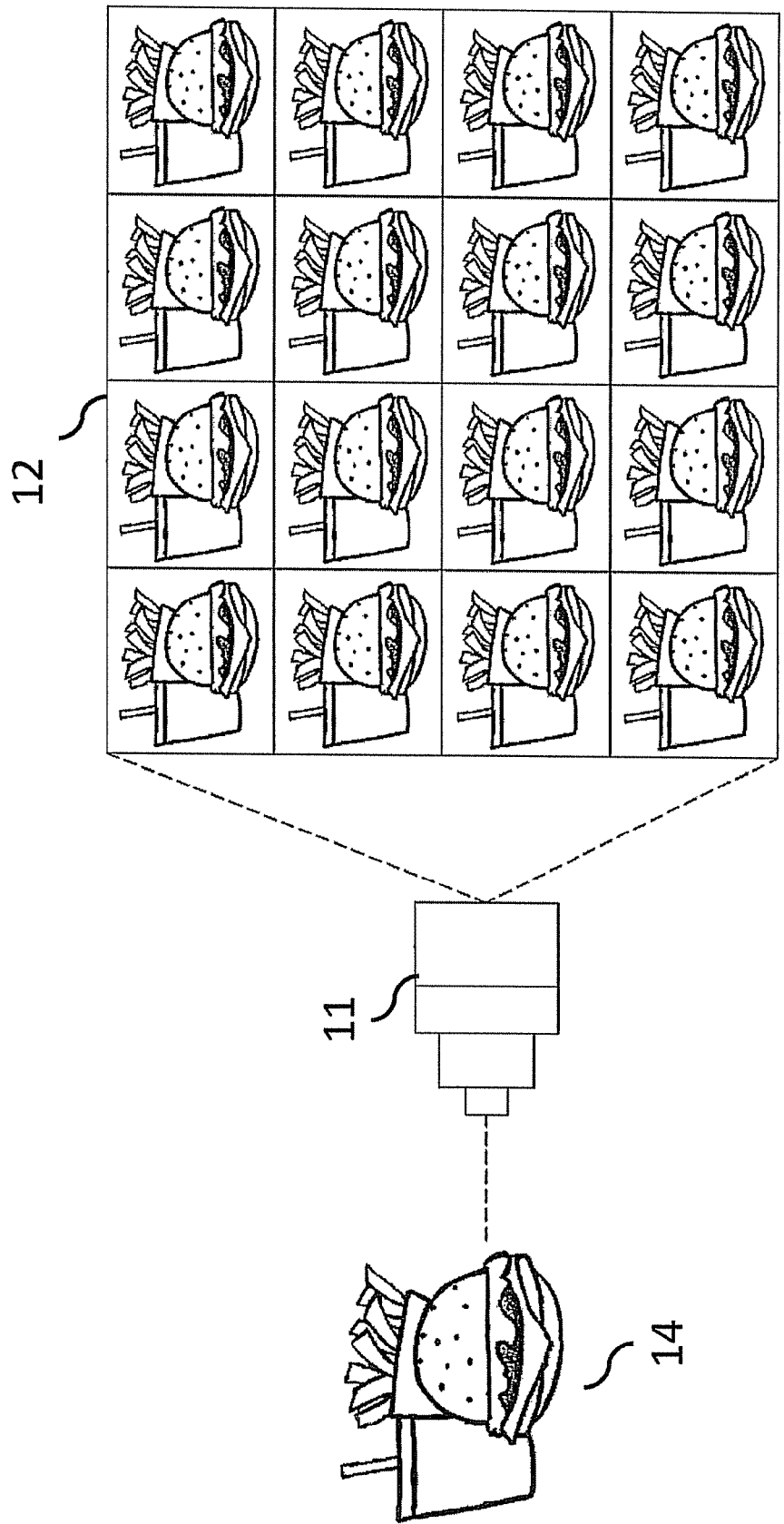
FIG. 1C illustrates a schematic view of the multi-point spectral module shown in FIG. 1A according to an exemplary embodiment of the disclosure.

FIG. 1B illustrates a front view of the multi-wavelength filter (MWF) shown in FIG. 1A according to an exemplary embodiment of the disclosure. The MWF 12 includes plural narrow-bandpass filter (NBPF) units which are arranged in an array and allow corresponding amount of wavelengths of imaging light to pass therethrough, respectively. The central transmitted wavelengths of the NBPF units may be different from one another, but not limited thereto. In an embodiment, the central transmitted wavelengths of the NBPF units may be determined according to the number of the NBPF units and a predetermined spectral band. For example, as shown in FIGS. 1B and 1C, a spectral band (ranged from 380 nm to 800 nm, typically) may be the predetermined spectral band, and it is assumed that the MWF 12 has sixteen NBPF units. Hence, the sixteen central transmitted wavelengths may be determined in a sequence as 400 nm, 423.75 nm, 447.5 nm . . . 756.25 nm, 780 nm, and the Full-Width-Half-Maximum (FWHM) of the transmitted wavelength band of each NBPF unit may be 10 nm, 20 nm, and 30 nm, etc. They may be arranged randomly in space. The scope of the disclosure is not limited thereto.

Referring to the embodiments shown in FIGS. 1B and 1C, the MWF 12 includes sixteen NBPF units which are arranged in a 4×4 array and allows sixteen duplicate images of respective pre-determined wavelengths to be transmitted therethrough. The imaging lens 11 may form sixteen duplicate images of the scene 14 in a 4×4 array onto the NBPF units, respectively. And then, the sixteen images can transmit the sixteen NBPF units, respectively, and form the images to the image capturing module 20 with sixteen duplicate images having respective spectral wavelengths.

Referring to the embodiments shown in FIGS. 1A and 1D-1F, the image capturing module 20 includes a color-image sensing element 21, and the color-image sensing element 21 has an image-sensing region divided into a plurality of image-sensing areas corresponding to the plurality of NBPF units, respectively. Each of the plurality of image-sensing areas includes plural micro light-sensing units arranged in an array. As a result, each image is formed on a respective image-sensing area in the image-sensing region of the color-image sensing element 21, and then the image capturing module 20 may output the sixteen duplicate images of the scene 14 by capturing the image signals of the sixteen image-sensing areas in the image-sensing region of the color-image sensing element 21, respectively. In other words, each of the images output from the image capturing module 20 includes its corresponding information of wavelength according to the central transmitted wavelengths of the NBPF units, respectively. In one embodiment, at least two, but not all of the plural NBPF units within the MWF 12 may have the same or similar central transmitted wavelengths. Also, the number and the arrangement of the NBPF units are not limited to the disclosed embodiments.

Figure 1E:
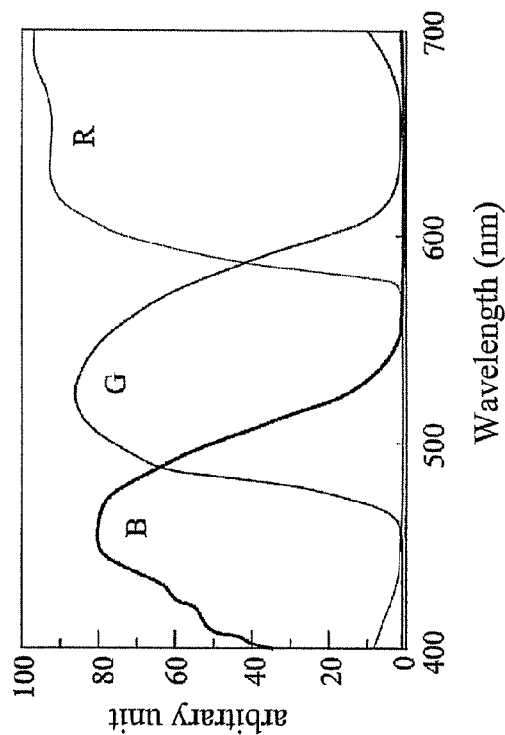
FIG. 1E illustrate s a schematic graph of responsive spectrum of the image capturing module shown in FIG. 1A according to an exemplary embodiment of the disclosure.
Figure 1D:
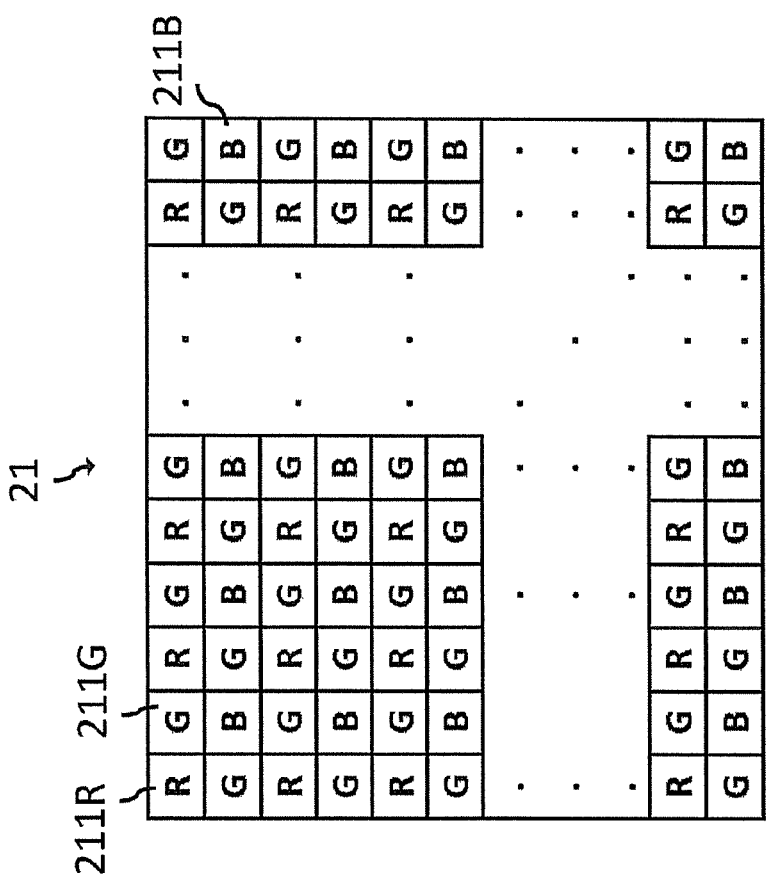
FIG. 1D illustrates a front view of the image capturing module shown in FIG. 1A according to an exemplary embodiment of the disclosure.

In the embodiments shown in FIGS. 1A and 1D-1E, the two-dimensional array of micro light-sensing units of the color-image sensing element 21 may include three kinds of color micro-units (denoted by 211R, 211G and 211B) that are registered light in red (denoted by R), green (denoted by G), and blue (denoted by B) spectral bands, respectively. Those color micro-units in the array are generally arranged in rows and columns, such as Bayer pattern form shown in FIG. 1D, and the color-image sensing element 21 may include a photoelectric conversion element 202 such as a charge-coupled device (CCD) sensor, a complementary metal-oxide semiconductor (CMOS) sensor, or the like. In one embodiment, the photoelectric conversion element 202 may include a light sensing layer made of silicone, organic materials, or quantum dots (QDs); for example, the light sensing layer made of silicone may be a silicon photodiode, but the scope of the present disclosure is not limited thereto.

Still referring to the embodiments shown to FIGS. 1A and 1D-1E, commonly used commercial color-image sensing element 21 may include a built-in color filter array 201 which may include plural Red, Green and Blue color micro-filters arranged in an array, and the built-in color filter array 201 may cover the photoelectric conversion element 202. In other words, the color-image sensing element 21 may include plural color micro-units in an array including the built-in color filter array 201 and the photoelectric conversion element 202.

Still refer to the embodiments shown in FIGS. 1D-1E, but the scope of the disclosure is not limited thereto. The R color micro-units 211R of the color-image sensing element 21 may have a wavelength band of responsive spectrum that covers from 600 nm to 760 nm, the G color micro-units 211G of the color-image sensing element 21 may have a wavelength band of responsive spectrum that covers from 510 nm to 590 nm, and the B color micro-units 211B of the color-image sensing element 21 may have a wavelength band of responsive spectrum that covers from 390 nm to 500 nm. In other embodiments, the built-in color filter array of the color-image sensing element may be a CMY (cyan, magenta, yellow) color filter array, a RGBW (red, green, blue, white) color filter array, or a CYGM (cyan, yellow, green, magenta) color filter array, etc.

As aforementioned, each of the images with its wavelength is projected onto its corresponding one of the image-sensing areas within the image-sensing region of the color-image sensing element 21, and each kind of color micro-units has its responsive spectrum band. Thus, the image capturing module 20 may capture signals of each image according to the wavelength of the image formed on a respective image-sensing area in the image-sensing region and the responsive spectrum band of each kind of color micro-units within the image-sensing region of the color-image sensing element 21.

Figure 1F:
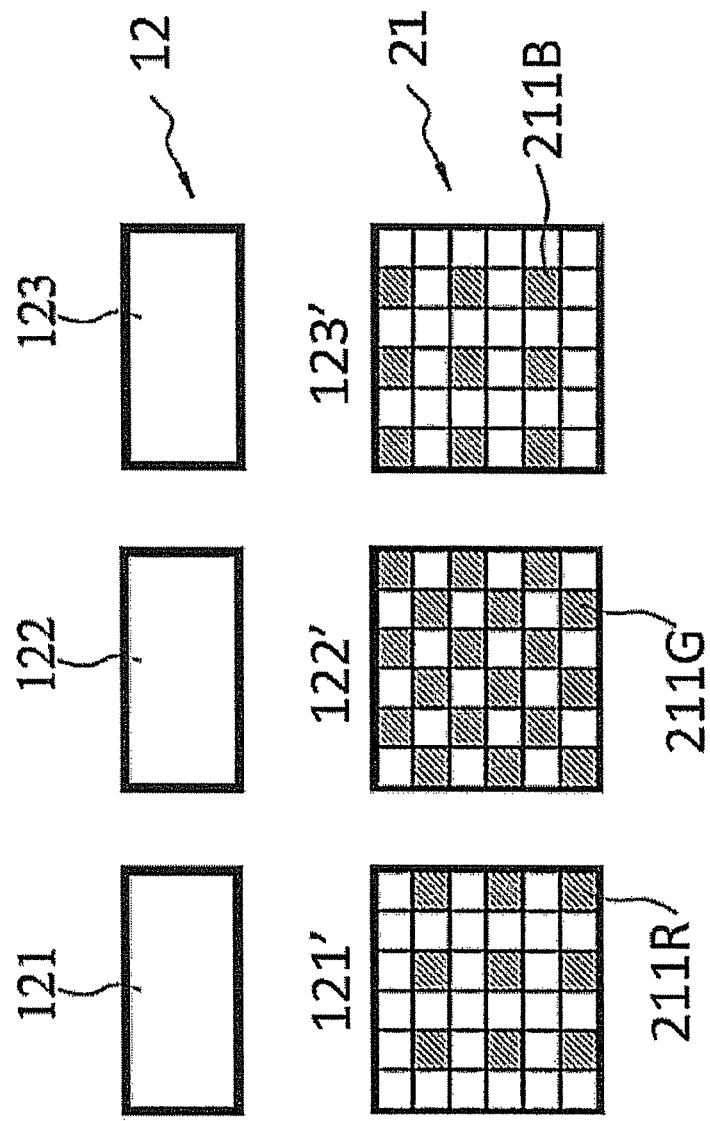
FIG. 1F illustrates a schematic view of how the MWF and the image capturing module shown in FIG. 1A according to an exemplary embodiment of the disclosure.

Take the example of FIGS. 1B, 1C and 1F, but the scope of the disclosure is not limited thereto. The central transmitted wavelengths of the NBPF units 121-123 may be determined to 650 nm, 550 nm and 450 nm, respectively. Thus, the color-image sensing element 21 may output the signals of the image of the B color micro-units within a corresponding area 123', output the signals of the image of the G color micro-units within a corresponding area 122', and output the signals of the image of the R color micro-units within a corresponding area 121'.

In an embodiment, the NBPF unit may include a Fabry-Perot filter structure having a spacer between two reflectors. Typically, there are two kinds of reflectors applying to the Fabry-Perot filter structure. The first kind of reflector may be stacks of high and low refractive-index dielectric films and another kind of reflector may be metal films, but the scope of the disclosure is not limited thereto. The central transmitted wavelength of a Fabry-Perot filter structure may be tuned by varying an optical path length of the spacer. FIGS. 2A-2C depict embodiments utilizing the first kind of Fabry-Perot filter structures as the NBPF units into the multi-point spectral system. Also, FIG. 3 depicts an embodiment utilizing the second kind of Fabry-Perot filter structures as the NBPF units into the multi-point spectral system.

Figure 2:
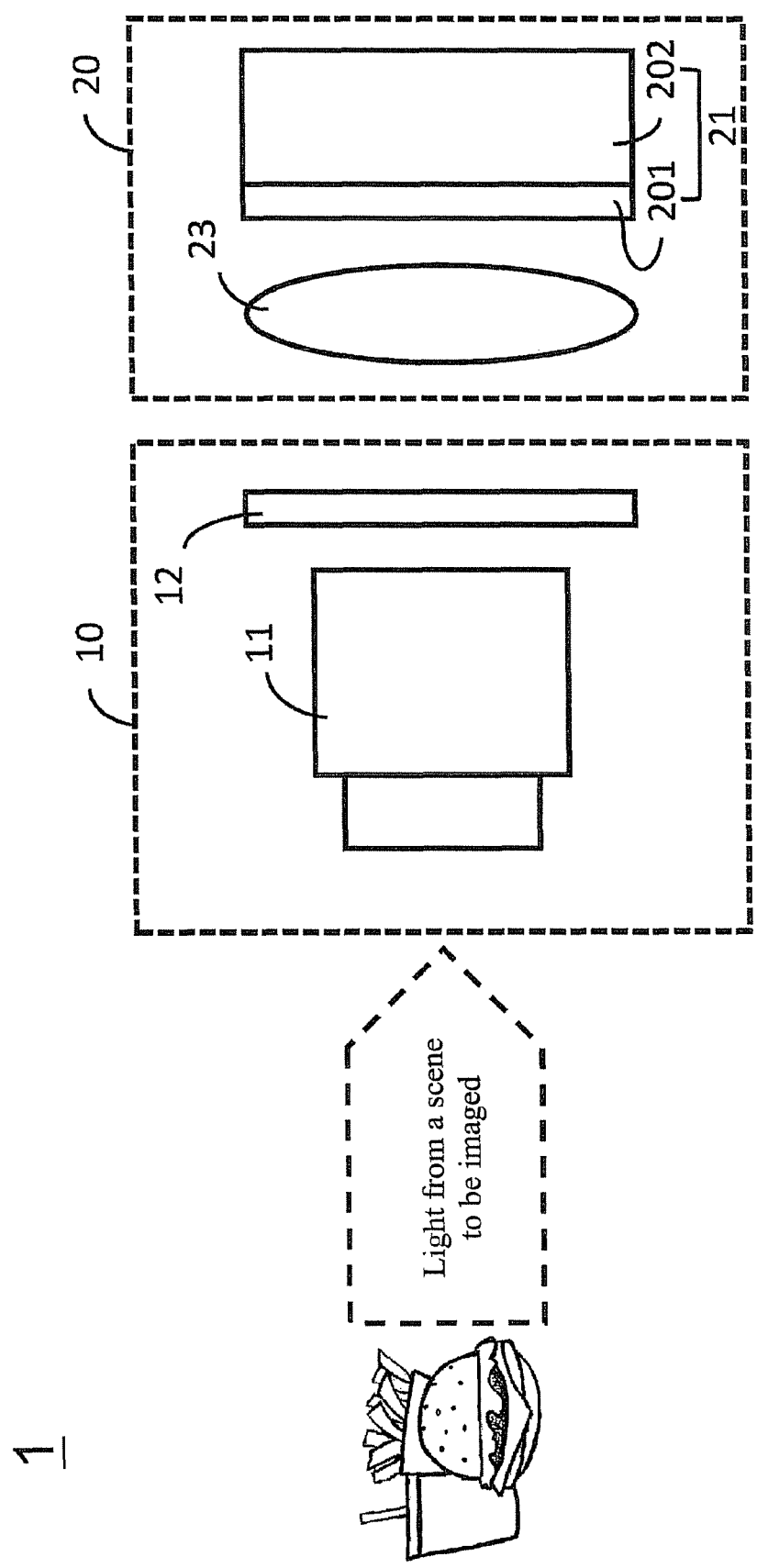
FIG. 2 illustrates a schematic view of a multi-point spectral system according to another exemplary embodiment of the disclosure.

Referring to an embodiment illustrated in FIG. 2, the image capturing module 20 may further include a built-in imaging lens 23, and the built-in imaging lens 23 may be in front of the color-image sensing element 21. In the present embodiment, the image capturing module 10 may be a digital imaging device which is popularly used in most of electronic devices (for example, smart phones, tablet personal computers, etc.). That is to say that in an embodiment, the multi-point spectral module 10 may be an external detachably multi-point spectral module including an imaging lens 11 and an MWF 12, and the detachably external multi-point spectral module 10 may be conveniently mounted on, connected to, clipped on or removed from a digital imaging device of an electronic device, such as a camera built in a smart phone. Namely, in an embodiment, the image capturing module 20 may further include a camera built in the electronic device.

Figure 3A:
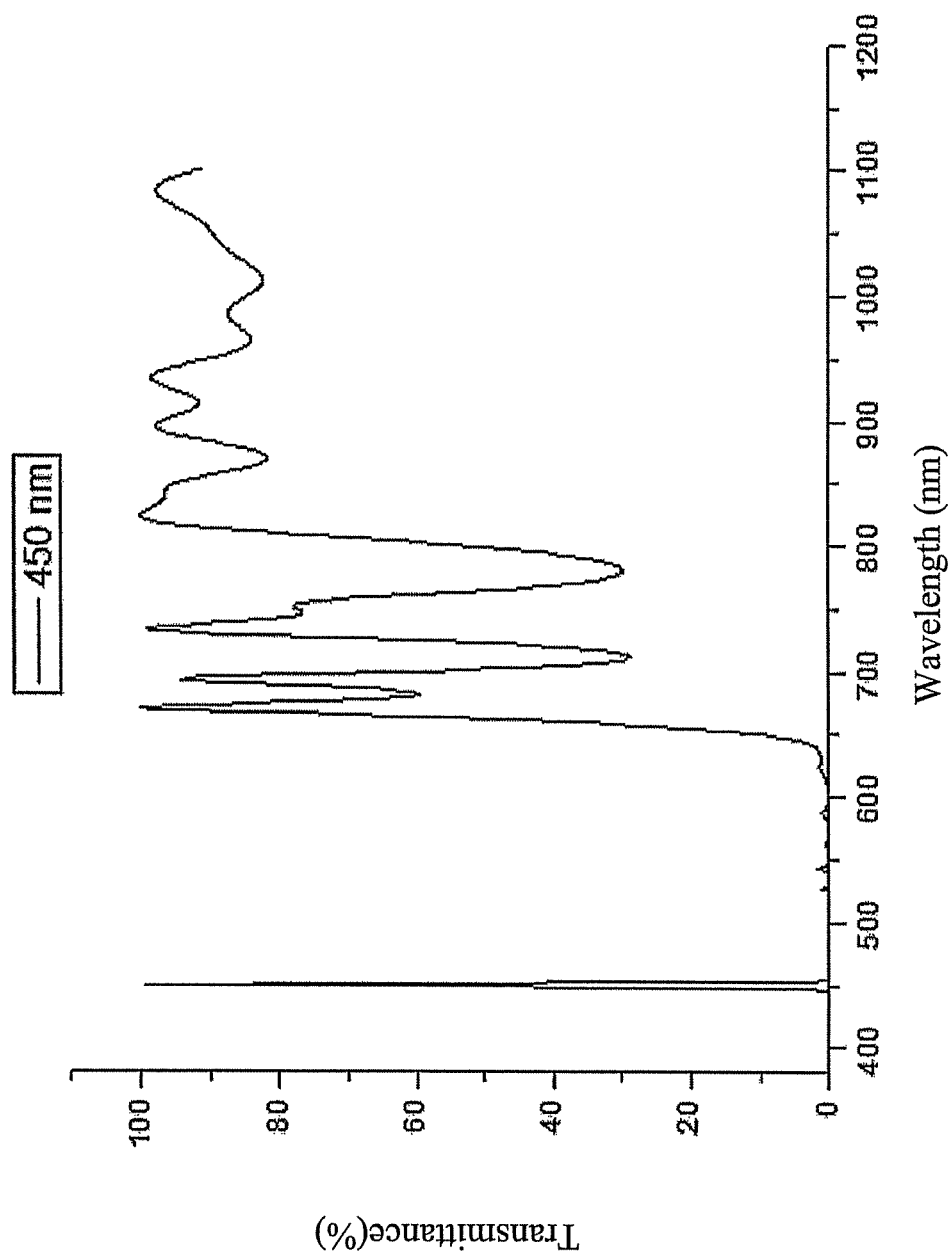
FIGS. 3A-3C illustrate transmitted spectrums of three Fabry-Perot filters constructed, respectively, in the MWF according to an exemplary embodiment of the disclosure.
Figure 3B:
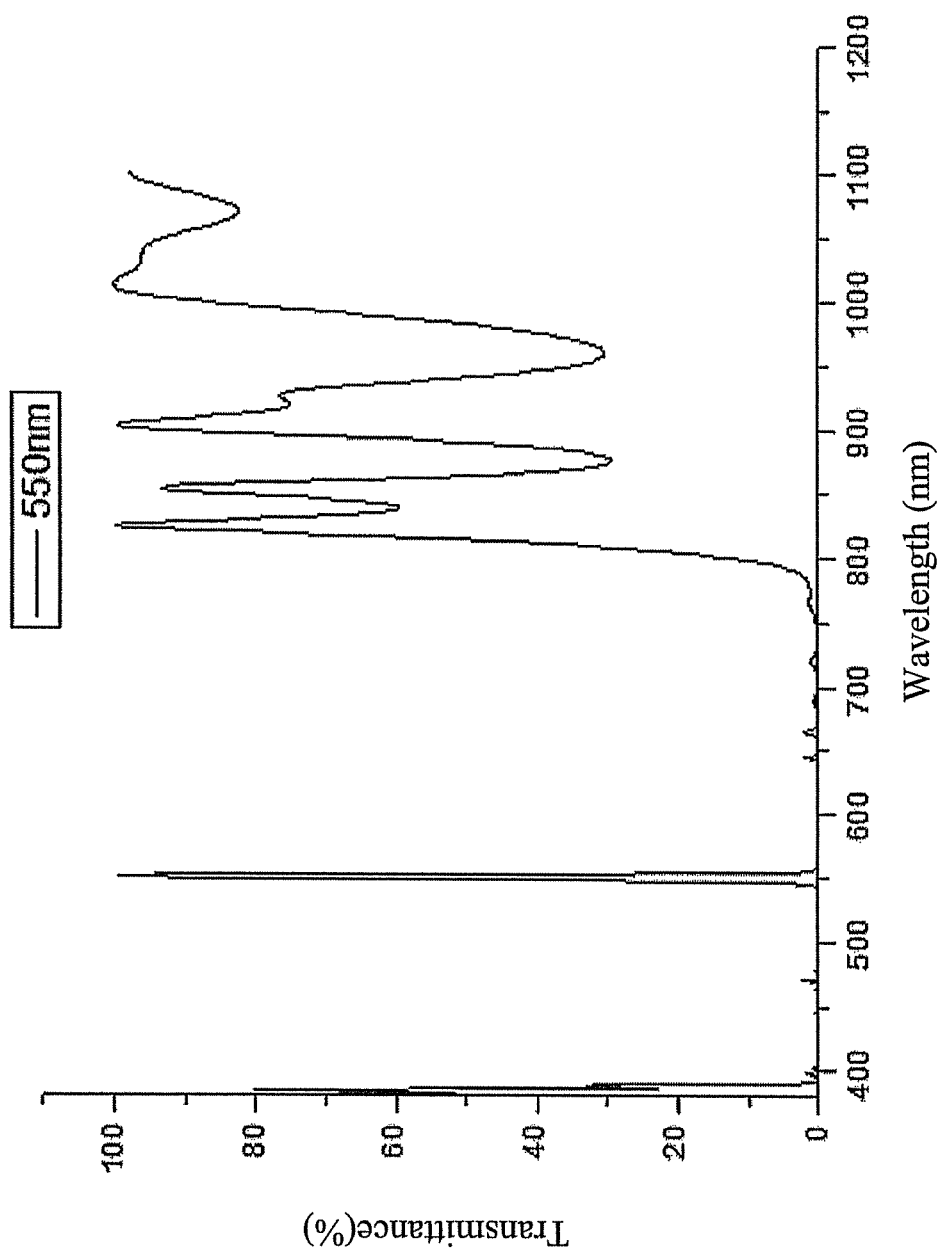
Figure 3C:
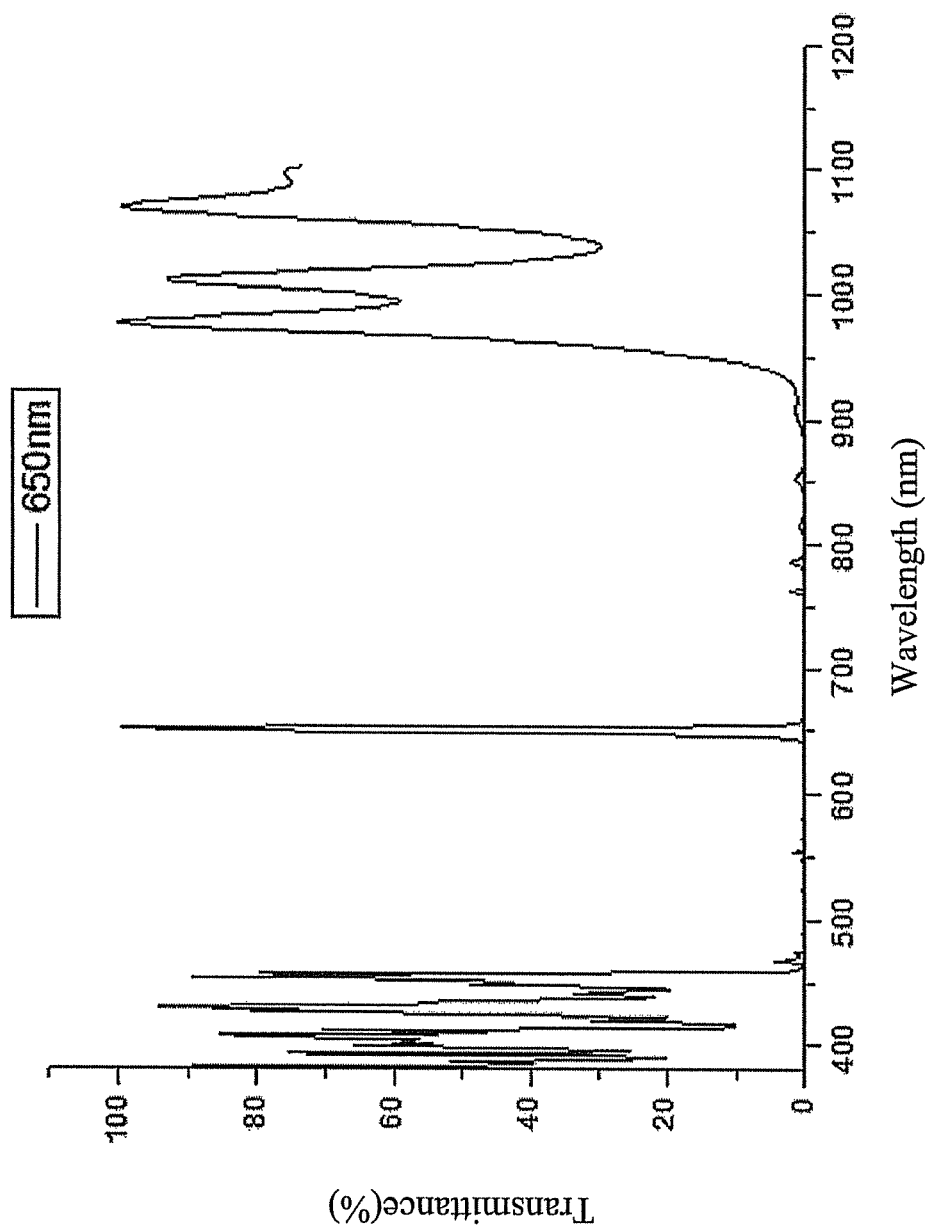
Figure 3D:
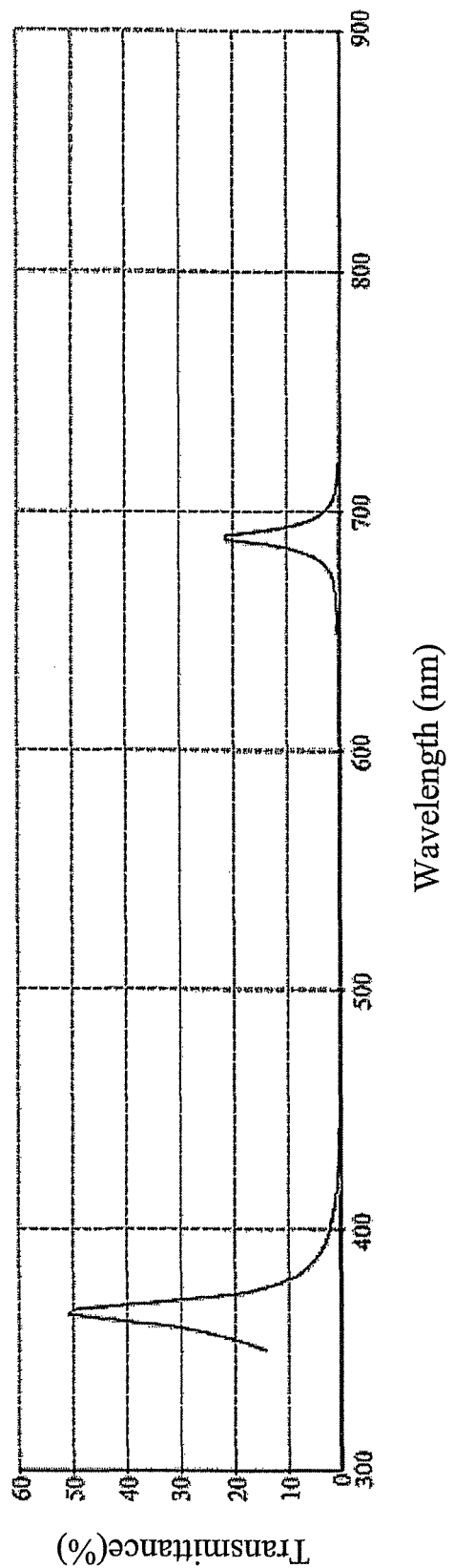
FIG. 3D illustrates transmitted spectrum of a Fabry-Perot filter in the MWF according to another exemplary embodiment of the disclosure.

FIGS. 3A-3C respectively illustrate the transmittance spectrums of three NBPF units having different central transmitted wavelengths. Taking the embodiment of FIGS. 1A-1F as an exemplar, the NBPF unit 123 may be formed as a Fabry-Perot filter structure that includes a spacer between two reflectors and the two reflectors are formed as stacks of high and low refractive-index dielectric films. In the embodiment, the central transmitted wavelength of the NBPF unit 123 is 450 nm, a Full-Width-Half-Maximum (FWHM) of the transmitted wavelength band is around 10 nm, and the transmittance dramatically decreases as the wavelength is out of that transmitted wavelength band. However, as the transmitted spectrum shown in FIG. 3A, the transmittance obviously increases as the wavelengths are greater than 650 nm, and the transmitted light at wavelengths greater than 650 nm received by the photoelectric conversion element 22 may induce noise. As aforementioned in FIGS. 1D-1F, according to the responsive spectrum of each kind of color micro-units (R, G or B) which are built in the color-image sensing element 21, the color-image sensing element 21 may output the signals of the image of B color micro-units within the respective area 123', because undesired lights at wavelengths greater than 650 nm may be cut off by the built-in blue color filter within the color-image sensing element 21 and each B color micro-unit within the respective area 123' of the color-image sensing element 21 works as a low pass filter.

Also referring to the embodiment shown in FIG. 3B, the NBPF unit 122 is formed as a Fabry-Perot filter structure that includes a spacer between two reflectors and the two reflectors are formed as stacks of high and low refractive-index dielectric films. The central transmitted wavelength of the NBPF unit 122 is 550 nm, a Full-Width-Half-Maximum (FWHM) of the transmitted wavelength band is around 10 nm, and the transmittance dramatically decreases as the wavelengths are out of that transmitted wavelength band. However, as the transmitted spectrum shown in FIG. 3B, the transmittance obviously increases as the wavelengths are greater than 750 nm or less than 400 nm. Hence, those undesired lights at wavelengths greater than 650 nm or less than 400 nm may be cut off by the built-in green color filter within the color-image sensing element 21, and each G color micro-unit in the respective area 122' of the color-image sensing element 21 works as a band pass filter.

Still referring to the embodiment shown in FIG. 3C, the NBPF unit 121 is formed as a Fabry-Perot filter structure that includes a spacer between two reflectors, and the two reflectors are formed as stacks of high and low refractive-index dielectric films. The central transmitted wavelength of the NBPF unit 121 is 650 nm, a Full-Width-Half-Maximum (FWHM) of the wavelength range is around 10 nm, and the transmittance dramatically decreases as the wavelengths of lights are out of that wavelength range. However, as the transmitted spectrum shown in FIG. 3C, the transmittance obviously increases as the wavelengths of lights are less than 480 nm. Hence, the undesired lights at wavelengths less than 480 nm may be cut off by a built-in red color filter within the color-image sensing element 21, and each R color micro-unit in the respective area 121' of the color-image sensing element 21 works as a low pass filter.

In another embodiment, the NBPF unit may be formed as a Fabry-Perot filter structure that includes a spacer between two reflectors, and the two reflectors are made of metallic films (such as Cr, Al, Ag, Au, Ti and/or the like). The central transmitted wavelength of a Fabry-Perot filter may be tuned by varying an optical path length of the spacer, for example, tuning the relative distance of the two metallic reflectors, but a peak of second (or higher) harmonic transmitted wavelength may appear and may induce noise if those undesired lights are received. As the transmittance spectrum shown in FIG. 3D, the central transmitted wavelength of the Fabry-Perot filter is around 370 nm, and a second (or higher) harmonic light appears when the wavelengths are greater than 690 nm. As similarly described above, the undesired second (or higher) harmonic light may be cut off by a built-in blue color filter within the color-image sensing element 21, and each B color micro-unit in the respective area of the color-image sensing element 21 works as a low pass filter.

As aforementioned, the image capturing module 20 may output plural duplicated images of the scene 14 by capturing the image signals of plural sensing areas of the color-image sensing element 21, respectively. In the embodiment, each of the image signals is provided with its corresponding information of wavelength according to the central transmitted wavelengths of NBPF units, respectively (for example, 400 nm, 423.75 nm, 447.5 nm . . . 756.25 nm, 780 nm), and then plural duplicated images 16 of the scene 14 may be produced as shown in FIG. 4C. Each image of the plural duplicated images 16 may be a mono-color image with a corresponding wavelength $\lambda_i$ (wherein i=1 . . . m, and m is a positive integer greater than one). In an embodiment, m may be equal to or less than the number of the NBPF units in the MWF 12. It is noted that the number and the arrangement of the NBPF units are not limited to the disclosed embodiments.

FIGS. 4A-4E illustrate a multi-point spectral system 1' according to an exemplary embodiment of the disclosure. The multi-point spectral system 1' may further include a processing device 30 for receiving the image signals of the spectral images 16 of the scene 14 output from the image capturing module 20. The processing device 30 may integrate the signals of each pixel of the spectral images 16, and then recognize the features revealed at any position of the scene 14 that is imaged by the multi-point spectral system 1'. Embodiments relating the processing device 30 of the multi-point spectral system 1' and the processing method thereof will be described as follows.

Figure 4A:
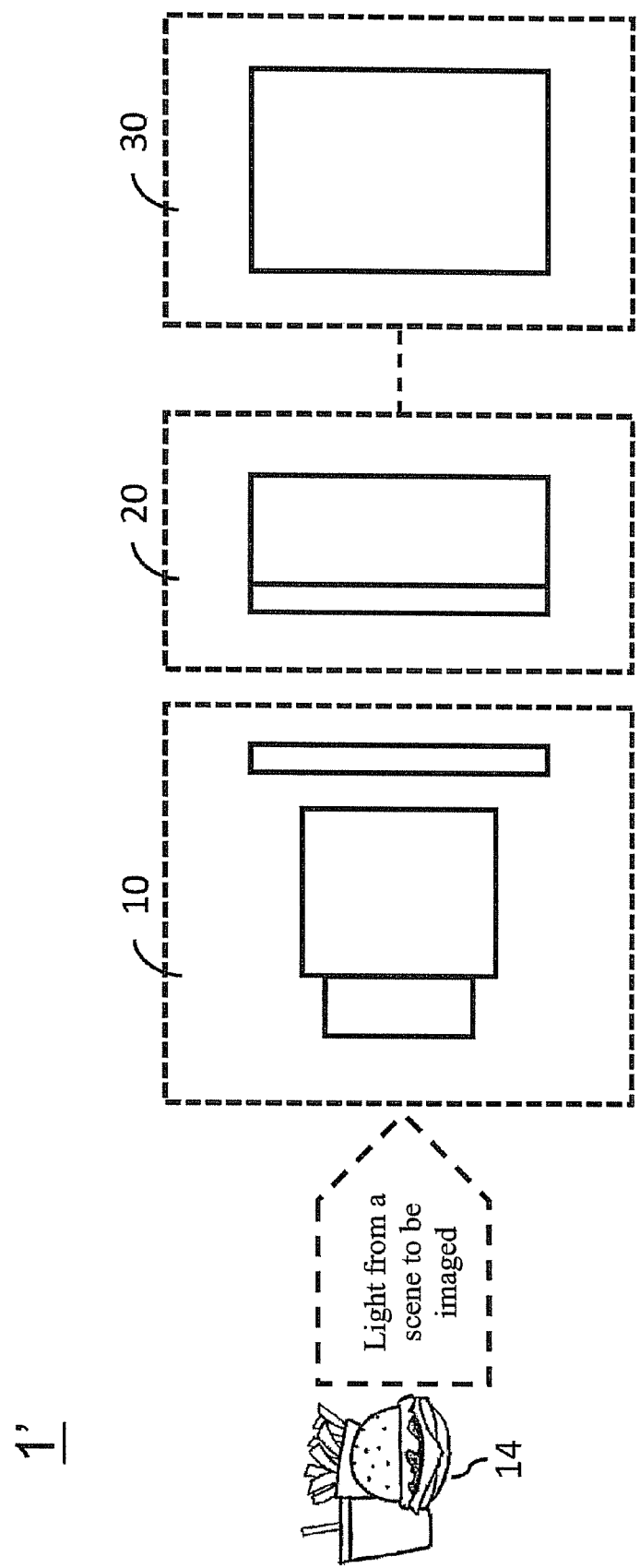
FIG. 4A illustrates a schematic side view of a multi-point spectral system further including a processing device according to an exemplary embodiment of the disclosure.
Figure 4B:
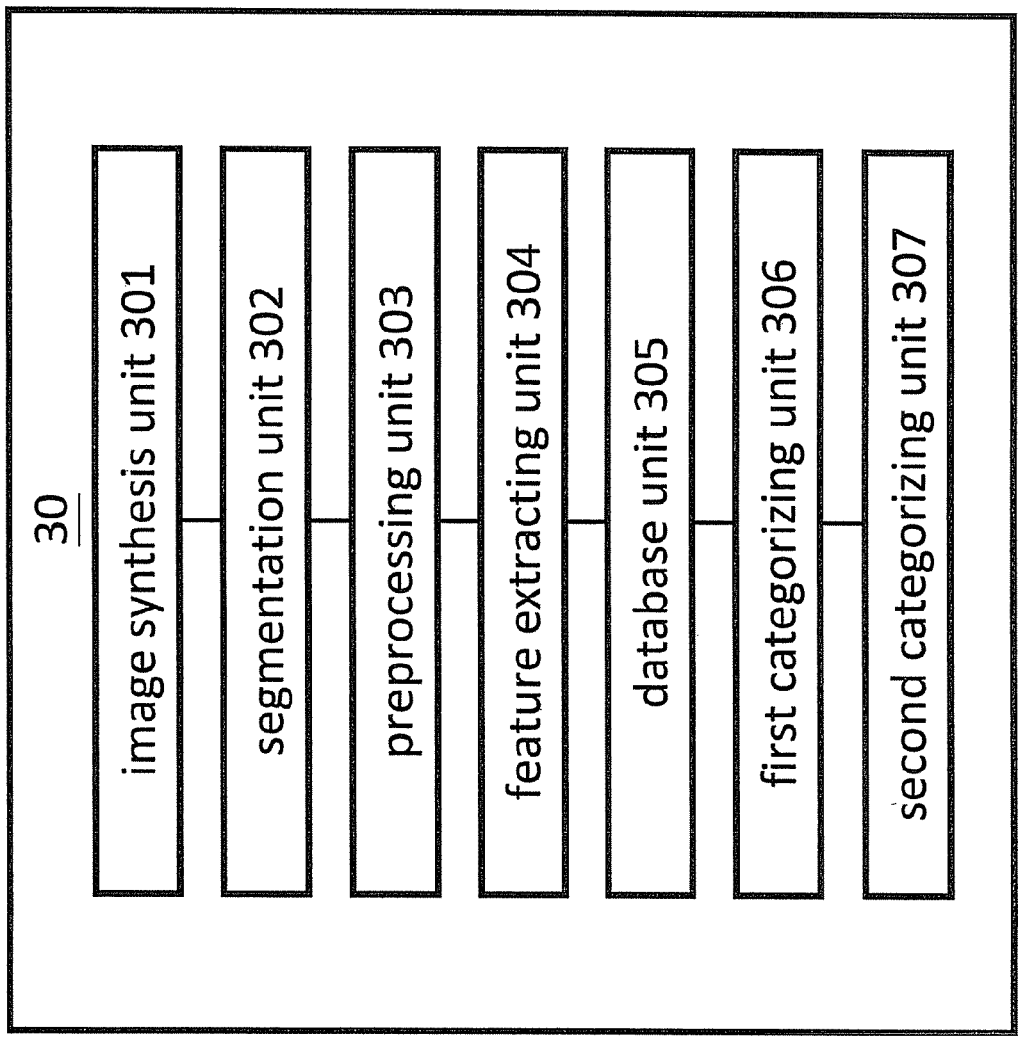
FIG. 4B illustrates a diagram of a processing device used in a multi-point spectral system according to an exemplary embodiment of the disclosure.
Figure 4C:
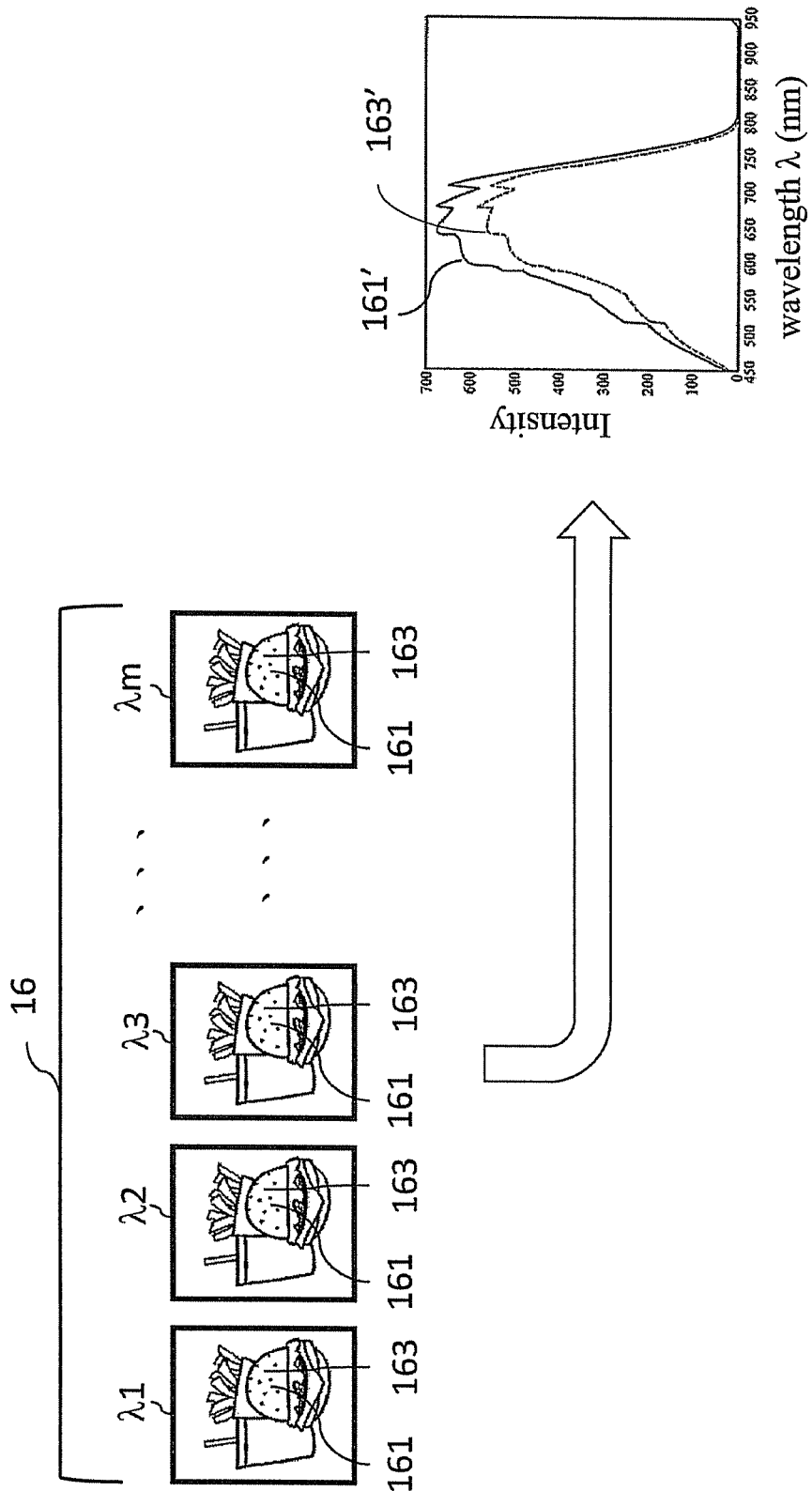
FIG. 4C illustrates a schematic view showing plural images of a scene captured by the multi-point spectral system according to an exemplary embodiment of the disclosure.

Referring to the embodiment shown in FIG. 4B, the processing device 30 may include an image synthesis unit 301, a segmentation unit 302, a preprocessing unit 303, a feature extracting unit 304, a database unit 305, a first categorizing unit 306 and a second categorizing unit 307. The processing device 30 may be, but not limited to a processor (for example, an Image Signal Processor (ISP)), a computer or a server which may communicate with the image capturing module, or the like.

Figure 4D:
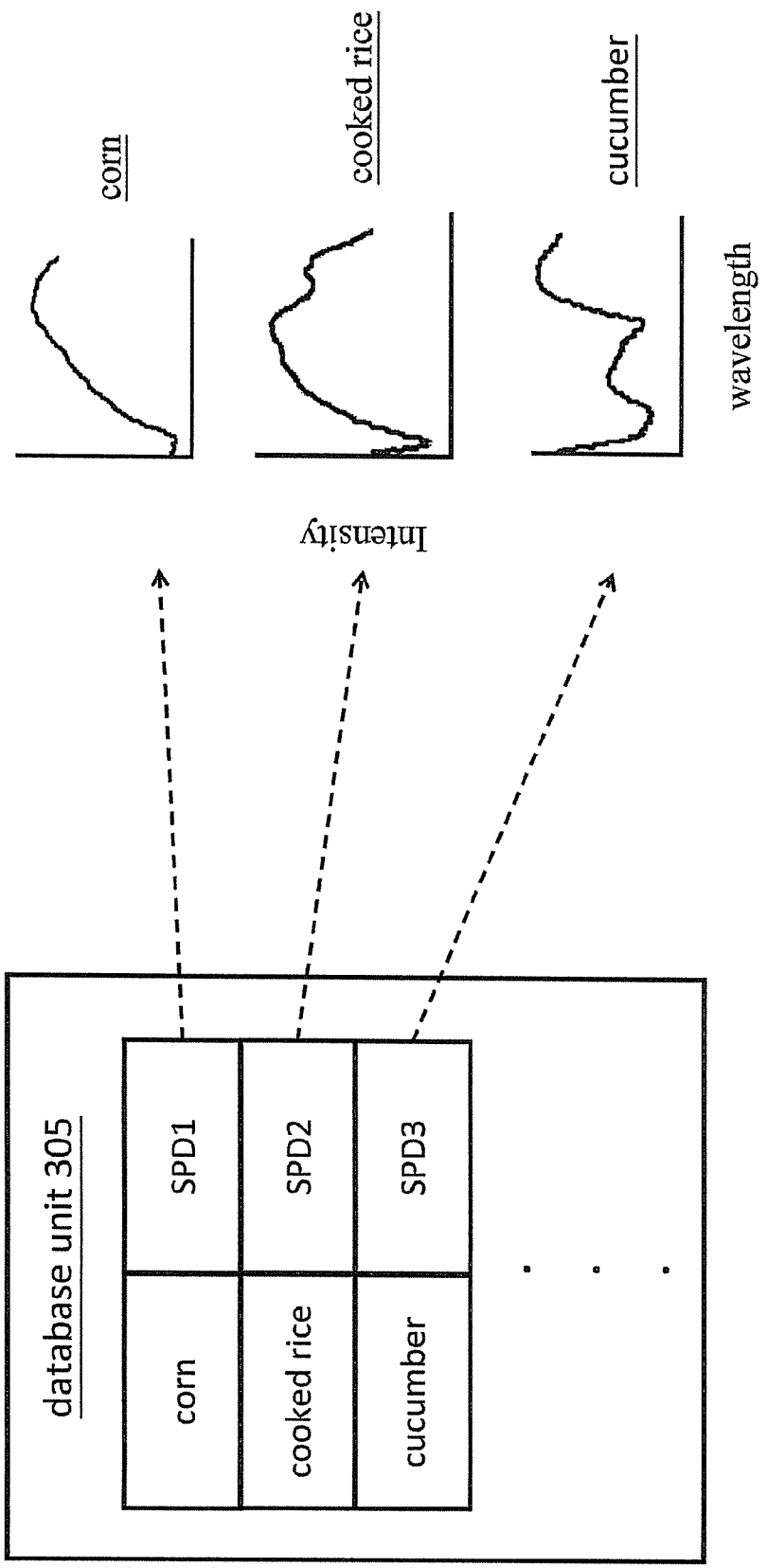
FIG. 4D illustrates a schematic view of a database unit storing plural spectrum distributions (SPDs) of foods used in a processing device of a multi-point spectral system according to an exemplary embodiment of the disclosure.

As aforementioned, the image signals captured by the image capturing module 20 may include plural duplicated images (i.e., the spectral images 16) of a scene 14 which are formed by the multi-point spectral module 10 of the multi-point spectral system 1'. Therefore, the spectral images 16 output from the image capturing module 21 may include plural duplicated images displaying the same scene 14 at different wavelengths. Referring to the embodiment shown in FIGS. 4B to 4D, the image synthesis unit 301 may synthesize the spectral images 16 into information of plural spectral distributions as shown in FIG. 4C. The spectrum distribution 161' may be extracted by the image synthesis unit 301 through synthesizing the intensity and the wavelength information of a corresponding pixel 161 from each image of the spectral images 16, and also another spectrum distribution 163' of another pixel 163 may also be extracted in the same way. The spectrum distribution 161' may represent an identification of an object that is imaged at the pixel 161, and so may the spectrum distribution 163'. For example, when a captured image reveals a corn or part of a corn at the pixel 161, the corresponding spectrum distribution 161' may show the same or similar distribution profile as shown in FIG. 4D.

In a still embodiment, the image synthesis unit 301 may further produce a RGB-color image by synthesizing the plural spectral images 16. The chromaticity at a color space XYZ of each pixel of the RGB-color image may be produced by the image synthesis unit 301 according to the equations shown below.

$$X=\int_0^\infty I(\lambda)\bar{x}(\lambda)d\lambda$$

$$Y=\int_0^\infty I(\lambda)\bar{y}(\lambda)d\lambda$$

$$Z=\int_0^\infty I(\lambda)\bar{z}(\lambda)d\lambda \quad (1)$$

$$R=3.240479*X-1.53715*Y-0.498535*Z$$

$$G=-0.969256*X+1.875991*Y+0.041556*Z$$

$$B=0.055648*X-0.204043*Y+1.057311*Z \quad (2)$$

In equation (1), X, Y, and Z represent tristimulus values of a pixel (i.e., the pixel 161 shown in FIG. 4C, but is not limited thereto) in the CIE-XYZ color space, $I(\lambda)$ represents a spectrum distribution of the pixel which may be synthesized by image synthesis unit 301 as aforementioned, and $\bar{x}(\lambda)$, $\bar{y}(\lambda)$ and $\bar{z}(\lambda)$ represent eye sensitivity functions. Then, an RGB-color image may be produced by converting the X, Y, and Z tristimulus values of each pixel of the spectral images 16 to R, G, and B tristimulus values in CIE-RGB color space through equation (2). In other word, Information related colors of materials may also represent some kind of identification for the materials, so information related colors of materials revealed in the plural images output from the multi-point spectral system 1' may also be provided for material or object recognition and this may enhance the accuracy of the multi-point spectral system 1'.

Still referring to the embodiment shown in FIG. 4B, the segmentation unit 302 may partition an image of the scene 14 output from the multi-point spectral system 1' into plural regions. In one embodiment, segmentation unit 302 may execute the partitioning process in accordance with a species or a common feature of an object revealed in the image. For example, an image of a scene 14 captured by the spectral imaging system 1' may reveal images of plural foods therein, such as scrambled eggs with tomatoes, kung pao chicken and fried vegetables. Thus, in the embodiment, the scrambled eggs with tomatoes may be assigned to be one partitioned region, the kung pao chicken may be assigned to be another partitioned region, and the fried vegetables may be assigned to the other partitioned region. In the embodiment, a minimum processed unit may be determined to be processed and include at least one pixel, and each partitioned region of the image may include one or more minimum processed units. A represent spectrum distribution of a minimum processed unit may be extracted by the image synthesis unit 301 through the aforementioned way; and the represent spectrum distribution may be an averaged of plural spectrum distributions when the minimum processed unit includes plural pixels. The following are exemplary description of processing method applied to each partitioned region of the image.

The preprocessing unit 303 may execute a noise filtering process to the spectrum distributions with a low-pass filtering process, a high pass filtering process, a Gaussian filtering process, or any other signal filtering process. In the embodiment, a Hilbert Huang Transform (HHT) process or a Moving Average process may be executed to the signals of the integrated spectrum distributions. The scope of the disclosure is not limited thereto.

The feature extracting unit 304 may execute a principal components analysis (PCA) to extract one or more spectral features which have a relatively higher weighting to represent for the processed spectrum distribution. In the embodiment, each minimum processed unit of each partitioned region of the image may be processed by the feature extracting unit 304, and may output plural spectral features corresponding with each minimum processed unit. The scope of the disclosure is not limited thereto.

In the embodiment, the database unit 305 may store plural spectrum distributions or spectral features of known materials. Take FIG. 4D as an example, but the scope of the disclosure is not limited thereto. The database unit 305 may store plural spectrum distributions (SPDs) or spectral distribution features of foods, such as corn, cooked rice, cucumber, etc.

Then, in the embodiment, the first categorizing unit 306 may execute an categorized algorithm between the plural features corresponding with each minimum processed unit of each partitioned region of the image and the spectral features in the database unit 305 to figure out the materials/objects through the spectrum distributions acquired from the multi-point spectral system 1'. The first categorizing unit 306 may output one or more similarity results corresponding with each partitioned region after the process.

In one embodiment, the first categorizing unit 306 may execute the comparison by calculating a Euclidean distance between the spectral features of a minimum processed unit and the storage spectral features in the database unit 305, and the equation for calculating the Euclidean distance is shown below.

$$d(p, q) =$$
$$d(q, p) = \sqrt{(q_1 - p_1)^2 + (q_1 - p_1)^2 + \ldots + (q_n - p_n)^2} = \sqrt{\sum_{i=1}^{n} (q_i - p_i)^2}$$

Then, the first categorizing unit 306 may execute radial basis function kernel theory to convert the Euclidean distances into values of the similarity which ranges from 0 to 1. In one embodiment, the most five values of the similarity may regarded as the similarity results, wherein the most value of the similarity result is 1, if the similarity results are greater than a first threshold (such as 0.8) and an absolute value of an accuracy error of any two of the similarity results are less than a second threshold (such as 0.04), then the compared spectral features of the material from the database unit 305 may be represent as the recognition result of the partitioned region of the image. The scope of the disclosure is not limited thereto.

In one embodiment, the first categorizing unit 306 may further execute an initial categorizing process. After a categorized process, at least one of averaged spectrum is calculated by the first categorizing unit 306 by averaging the plural spectral features of the plural minimum processed units which are categorized as the same category. Thus, a signal to noise ratio may be improved. Then, the first categorizing unit 306 may repeatedly execute a categorized algorithm to the averaged spectrums of the categories till one or more recognition results of the similarity results may be carried out.

If more than 50% of similarity results of the minimum processed units in one partitioned region are less than a predetermined value (such as 0.5), the second categorizing unit 307 may execute an unmixing process to all the minimum processed units in one of the partitioned regions to output plural of new similarity results. The second categorizing unit 307 may further execute a categorizing process to each pixel in one partitioned region according to the new similarity results, to get averaged spectrum distributions of the same category of pixels, and then execute the process as the first categorizing unit 306 executes as above to produce one or more recognition results. Take the partitioned region of the image of scrambled eggs with tomatoes as example. Two unknown categories A and B are obtained by the unmixing process according to the spectrums of all the minimum processed units, and then pixels in the partitioned region are categorized into category A or category B by the categorized algorithm similar to categorizing unit 306 or a new one. Then, the averaged spectrums of the category A or category B are carried out, respectively, for reorganization.

The second categorizing unit 307 may be applied when the first categorizing unit 306 cannot carry out the one or more similarity results, for example, when an meal of mixing foods whose averaged represent spectrum cannot be categorized into any category of foods stored in database unit 305 or when the averaged represent spectrums are so similar during reorganization process executed by the first categorizing unit 306.

It will be apparent to those skilled in the art that various modifications and variations may be made to the disclosed embodiments. It is intended that the specification and examples be considered as exemplary only, with a true scope of the disclosure being indicated by the following claims and their equivalents.

What is claimed is:

1. A multi-point spectral system, comprising:
    a multiwavelength filter (MWF) including a plurality of narrow-bandpass filter (NBPF) units arranged in an array, each of the plurality of NBPF units having a respective predetermined central transmitted wavelength;
    an imaging lens provided to form a plurality of duplicated images of a scene onto the plurality of NBPF units, respectively; and
    an image capturing module including a color-image sensing element, wherein the color-image sensing element has an image-sensing region divided into a plurality of image-sensing areas corresponding to the plurality of NBPF units, respectively, and each of the plurality of image-sensing areas includes plural color micro-units arranged in an array, wherein the color micro-units include a plurality of red color micro-units, a plurality of green color micro-units, and a plurality of blue color micro-units, and each of the plural color micro-units has a wavelength band of responsive spectrum;
    wherein the MWF is located between the imaging lens and the image capturing module, and the image capturing module captures the plurality of duplicated images of the scene, and
    wherein each of the plurality of NBPF units includes a transmitted wavelength band, and the transmitted wavelength band of the NBPF unit is narrower than the wavelength band of responsive spectrum of the color micro-unit.

2. The multi-point spectral system of claim 1, wherein at least two of the plurality of NBPF units have different predetermined central transmitted wavelengths.

3. The multi-point spectral system of claim 1, wherein the imaging lens and the MWF are assembled together in a multi-point spectral module.

4. The multi-point spectral system of claim 1, wherein each of the plurality of NBPF units has a Fabry-Perot filter structure.

5. The multi-point spectral system of claim 4, wherein the Fabry-Perot filter structure includes a spacer between two reflectors, and the two reflectors are made of dielectric films or metallic films.

6. The multi-point spectral system of claim 1, wherein the image capturing module further includes a built-in imaging lens, and the built-in imaging lens is in front of the color-image sensing element.

7. The multi-point spectral system of claim 1, wherein the color-image sensing element is a color charge-coupled device sensor or a color complementary metal-oxide semiconductor sensor.

8. The multi-point spectral system of claim 1, wherein the imaging lens includes a micro-lens array.

9. The multi-point spectral system of claim 1, further comprising a processing device provided to process the plurality of duplicated images.

10. The multi-point spectral system of claim 9, wherein the processing device includes:

an image synthesis unit configured to synthesize the plurality of duplicated images of the scene into information of plural spectral distributions of the scene;

a segmentation unit configured to partition an image of the scene into plural regions;

a feature extracting unit configured to extract one or more spectral features of the plural partitioned regions; and a first categorizing unit configured to execute a categorized algorithm between the spectral features of each partitioned region of the image and stored spectral features in a database unit, and produce one or more similarity results.

11. The multi-point spectral system of claim 10, wherein the feature extracting unit executes a principal components analysis (PCA) to extract the one or more spectral features.

12. The multi-point spectral system of claim 10, wherein the first categorizing unit executes a comparison by calculating plural Euclidean distances between the spectral features of the plural partitioned regions and the stored spectral features in the database unit, converts the Euclidean distances into plural similarity values, and outputs most five of the plural similarity values as the similarity results.

13. The multi-point spectral system of claim 12, wherein the processing device further includes a second categorizing unit, and the second categorizing unit executes an unmixing process to the similarity results which are less than a threshold value, and produces new similarity results.

14. The multi-point spectral system of claim 13, wherein each of the plural partitioned regions includes plural pixels, and a set including one or more of the pixels is regarded as a minimum processed unit by the feature extracting unit.

15. The multi-point spectral system of claim 14, wherein the second categorizing unit further categorizes each pixel of the plural partitioned regions into plural categories according to the new similarity results, and produces an averaged spectrum with pixels in a same category for recognition.

16. A multi-point spectral module being mounted on, clipped on or connected to an image capturing module of an electronic device with ease, comprising:

a multiwavelength filter includes a plurality of narrow-bandpass filter (NBPF) units arranged in an array, each of the plurality of NBPF units having a predetermined central transmitted wavelength, respectively; and an imaging lens provided to form a plurality of duplicated images of a scene onto the plurality of NBPF units, respectively, wherein the image capturing module includes a color-image sensing element having an image-sensing region divided into a plurality of image-sensing areas corresponding to the plurality of NBPF units, respectively, and each of the plurality of image-sensing areas includes plural color micro-units arranged in an array, and wherein the color micro-units include a plurality of red color micro-units, a plurality of green color micro-units, and a plurality of blue color micro-units, and each of the plural color micro-units has a wavelength band of responsive spectrum, and wherein each of the plurality of NBPF units includes a transmitted wavelength band, and the transmitted wavelength band of the NBPF unit is narrower than the wavelength band of responsive spectrum of the color micro-unit.

* * * * *